United States Patent
Elmendorf et al.

(10) Patent No.: US 7,031,989 B2
(45) Date of Patent: Apr. 18, 2006

(54) DYNAMIC SEAMLESS RECONFIGURATION OF EXECUTING PARALLEL SOFTWARE

(75) Inventors: Peter C. Elmendorf, Poughkeepsie, NY (US); Unmesh A. Ballal, Fishkill, NY (US); Harry J. Beatty, III, Clinton Corners, NY (US); Qi Yan, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 09/793,644

(22) Filed: Feb. 26, 2001

(65) Prior Publication Data

US 2002/0120601 A1    Aug. 29, 2002

(51) Int. Cl.
    *G06F 17/30*    (2006.01)
(52) U.S. Cl. ..................................... 707/206
(58) Field of Classification Search ............ 707/8, 707/200, 202, 206; 709/331; 717/153, 170, 717/168, 154, 111, 120; 711/150; 718/108
    See application file for complete search history.

(56) References Cited

U.S. PATENT DOCUMENTS

| 5,057,997 A * | 10/1991 | Chang et al. ............... 718/108 |
| 5,410,703 A * | 4/1995 | Nilsson et al. .............. 717/168 |
| 5,495,612 A * | 2/1996 | Hirayama et al. .......... 719/331 |
| 5,581,737 A * | 12/1996 | Dahlen et al. .............. 711/170 |
| 5,675,803 A * | 10/1997 | Preisler et al. .............. 717/131 |
| 5,692,193 A | 11/1997 | Jagannathan et al. |
| 5,812,811 A | 9/1998 | Dubey et al. |
| 5,875,461 A | 2/1999 | Lindholm |
| 5,905,896 A * | 5/1999 | Delannoy .................... 717/170 |
| 5,924,098 A * | 7/1999 | Kluge ......................... 707/100 |
| 6,063,128 A * | 5/2000 | Bentley et al. ................. 703/6 |
| 6,108,754 A | 8/2000 | Lindholm |
| 6,112,253 A * | 8/2000 | Gerard et al. ............... 709/315 |
| 6,226,653 B1 * | 5/2001 | Alpern et al. ............... 707/206 |
| 6,339,787 B1 * | 1/2002 | Yohe et al. .................. 709/217 |
| 6,401,104 B1 * | 6/2002 | LaRue et al. ............... 707/203 |
| 6,457,170 B1 * | 9/2002 | Boehm et al. .............. 717/106 |
| 6,477,545 B1 * | 11/2002 | LaRue ......................... 707/201 |
| 2002/0133508 A1 * | 9/2002 | LaRue et al. ............... 707/202 |
| 2003/0050996 A1 * | 3/2003 | Yohoe et al. ............... 709/217 |

* cited by examiner

*Primary Examiner*—Kim Vu
*Assistant Examiner*—Monplaisir Hamilton
(74) *Attorney, Agent, or Firm*—Jay H. Anderson

(57) ABSTRACT

A method is described for dynamic stitching of a new module of executable code in a parallel processing environment, where access to a data object is shared by the new module and another module previously loaded. A new data object is created for shared access by the new module and by the other module; a data freshness indicator is updated in accordance therewith. A pointer value for the data pointer associated with the other module is modified, thereby terminating reference to an old data object previously accessed and substituting reference to the new data object. A second data freshness indicator is updated in accordance with access by the other module to the new data object. The old data object is deleted when a comparison between freshness indicators shows that access to the old data object is no longer required.

21 Claims, 10 Drawing Sheets

DYNAMIC SEAMLESS RECONFIGURATION OF EXECUTING PARALLEL SOFTWARE

RELATED APPLICATIONS

This application is related to application Ser. Nos. 09/597,523, 09/597,524 and 09/597,525, all filed Jun. 20, 2000. All of these related applications are assigned to the same assignee as the present application. The disclosures of all these related applications are incorporated herein by reference.

FIELD OF THE INVENTION

This invention relates to parallel computer processing, and more particularly to the management of a parallel processing environment in which software is dynamically loaded, unloaded or modified.

BACKGROUND OF THE INVENTION

In parallel computer processing, a single program can simultaneously run different threads (that is, independent flows of control) managed by the program. An important feature of parallel processing is dynamic loading and unloading of executable modules which are portions of an executing program. This dynamic loading and unloading is performed by support code generally called the "runtime library." The runtime library is designed to minimize the interruption of the execution of the previously loaded software while adding a new module or removing an existing module.

A typical parallel processing system is shown schematically in FIG. 1. Processors 11-1, 11-2, 11-3, ... 11-n are each connected to a main memory 100, which holds the runtime library 101 and the driver application 102. The runtime library is physically separate from the driver application, but is linked thereto. Modules of executable code 103-1, 103-2, 103-3, ... 103-n, provide services used by the driver application and are loaded in the main memory when needed. A module load can consist of a single module (as shown in FIG. 1) or a module tree.

A schematic representation of a single-threaded computing environment is shown in FIG. 2. A thread in combination with a specific set of data, for execution of a particular computation, is referred to as a "context." As shown schematically in FIG. 2, the driver application 102 issues commands to create a context 200 having module trees 201–203, resulting in the modules 103-1–103-9 being loaded in the context. It is noteworthy that a given module (e.g. 103–6) may be shared between module trees. The format of the modules is monitored and updated by the runtime library 101. Execution in this environment proceeds sequentially through module trees 201, 202 and 203.

Modules in a context are loaded into main memory and "stitched" together for efficient execution. It is desirable, of course, that stitching of new modules to previously loaded modules be performed dynamically (that is, with minimum interruption of execution).

A "system context" is a context which the runtime library uses to perform certain functions, such as module loading, garbage collection (preparing old data for deletion) and dynamic stitching. The runtime library, which can run on any context simultaneously, creates and manages the system contexts and system threads.

A parallel execution environment consists of two or more contexts with threads running independently, accessing thread-specific data or accessing locally or globally shared data. A schematic representation of a parallel computing environment is shown in FIG. 3. The environment of FIG. 3 has two contexts 301, 302 with module trees 311–313 and 321–323 respectively. Certain modules (e.g. 103–11, 103–12) may be shared between the contexts. A parallel environment is thus characterized by a plurality of contexts (threads and module trees; see FIG. 3) running on a plurality of processors (see FIG. 1). However, there need not be a one-to-one correspondence between the contexts and processors.

The modules and module trees loaded in one context are generally not visible to other contexts. A problem therefore arises when it is desired to modify the software (specifically, add or remove modules) while multiple, parallel threads are executing. For example, if a loaded module is removed while a thread is executing code contained in that module, the execution will fail (or at best yield unreliable results). Similarly, if a group of modules is to be added to a running system, this should be performed in a controlled manner in order to prevent executing threads from accessing an incomplete configuration of the added modules.

One possible way to avoid this problem is to suspend the execution of all the threads whenever a module is to be added or deleted. This approach adds to the complexity of the driver application by requiring startup, pause and shutdown routines. Furthermore, system performance is degraded as the number of threads increases.

There is a need for a software design which provides for dynamic loading and unloading of modules in a parallel computing environment, wherein sections of the software may be modified in a multithreaded system while actively running.

SUMMARY OF THE INVENTION

The present invention addresses the above-described need by providing a method for performing dynamic stitching of a new module of executable code in a parallel processing environment. Access to a data object is shared by the new module and another module previously loaded; this access is performed using a data pointer, having a pointer value, associated with each module.

In accordance with one aspect of the invention, when the new module is loaded a new data object is created for shared access by the new module and by the previously loaded module (with the previously loaded module accessing the new data object in place of an old data object). A first data freshness indicator is updated in accordance with creation of the new data object. A value of the first freshness indicator is associated with the old data object (thus serving as a "freshness stamp" on the old data object). A pointer value is established for a data pointer associated with the new module, to permit access to the new data object by the new module. The pointer value for the data pointer associated with the other module is modified, thereby terminating reference to the old data object previously accessed by the other module and substituting reference to the new data object. A second data freshness indicator is updated in accordance with access by the other module to the new data object. The old data object is deleted when a comparison of the second data freshness indicator with the value associated with the old data object indicates that access to the old data object is no longer required.

In a preferred embodiment of the invention, the first and second pointer values are atomic data, and the second pointer value is modified in a atomic operation.

A list ("garbage list") of old data objects subject to deletion may be established. An old data object is added to this list after creation of the new data object.

A plurality of previously loaded modules may share access to the new data object with the new module. Furthermore, the modules may comprise a plurality of contexts, with a freshness indicator being associated with each context. The old data object may be deleted after the context freshness indicators have been updated so that all such indicators are not less than the value associated with the old data object.

In accordance with another aspect of the invention, a method is provided for dynamic stitching of a new module in a parallel processing environment, where the new module and another previously loaded module include accessing code which, when executed, causes access to a data object. In this method, an instruction is first received to load the new module. New access to the data object is then prevented; however, continued access to the data object, already in progress when the instruction is received, is permitted to continue. The new module is loaded after this continued access is concluded. Initiation of access to the data object (invocation of the accessing code) is again permitted after the loading is performed. The loading may further include modification of the data object.

This method may further include establishing a usage counter associated with the data object, which is incremented and decremented in accordance with initiation and conclusion, respectively, of access to the data object. The value of the usage counter is changed to its own negative when an instruction to load a new module is received. This negative value is then incremented when each continued access is concluded. The value of the usage counter is compared with a predetermined value; the usage counter is reset when all continued access to the data object is concluded.

A negative value of the usage counter indicates that new access (invocation of the accessing code) is to be prevented; a value equal to the predetermined value (e.g. −1) indicates that new access may be resumed. Loading of the new module, and new access to the data object, are performed after the resetting of the usage counter.

In a preferred embodiment of this method, the value of the usage counter and the predetermined value are atomic data, so that the above-described incrementing, decrementing, changing comparing and resetting operations are atomic operations.

According to a further aspect of the invention, a method is provided for unloading a target module of executable code in a parallel processing environment, where the target module and another module share access to a data object. The access is performed using a data pointer having a pointer value; the target module and the other module comprise a context with a freshness indicator associated therewith. When an instruction is received to unload the target module, all new access to the module (invocation of the code in the module) is prevented; however, access already in progress (execution of the code in the module) is permitted to continue. The freshness indicator is updated, and old data associated with the target module is deleted in accordance with the updated value of the freshness indicator. The pointer value is modified after all access to the target module is concluded, thereby terminating reference to the data object by the target module. The target module is then unloaded.

The old data may have a freshness value associated therewith; the old data may be deleted when this freshness value is not greater than the updated value of the freshness indicator for the context.

According to another aspect of the invention, a computer-readable storage medium is provided which has stored therein instructions for performing the methods described above.

According to an additional aspect of the invention, a computer program product is provided which embodies instructions for performing the above-described methods.

An advantage of the present invention is that modules or groups of modules may be added while access to information and/or code is prevented until the added modules are in a usable state.

In a system using the method of the present invention, two cooperating programs may be managed without either program needing information regarding the internal details of the other. Furthermore, in the practice of the present invention, loading and unloading of a module group is a generalized concept from the programmer's point of view. Software design is greatly simplified by elimination of the need for startup, pause and shutdown routines that otherwise would be required when adding or deleting modules in an executing system.

DETAILED DESCRIPTION OF THE PREFERRED EMBODIMENTS

In accordance with the present invention, the runtime library manages the parallel processing environment by using (1) a dynamic stitching or "hot plug" method, (2) data freshness indicators, and (3) a usage blocking method, as detailed below.

Figure 1:
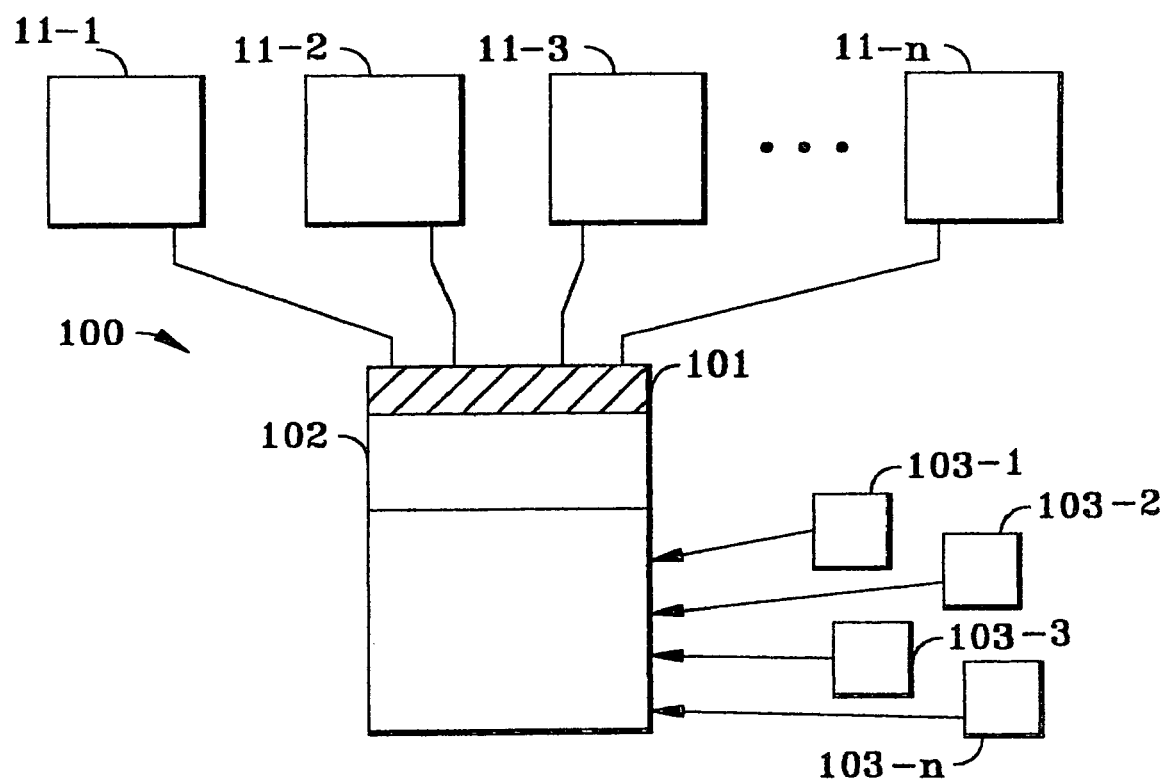
FIG. 1 is a schematic representation of a typical parallel processing environment.
Figure 2:
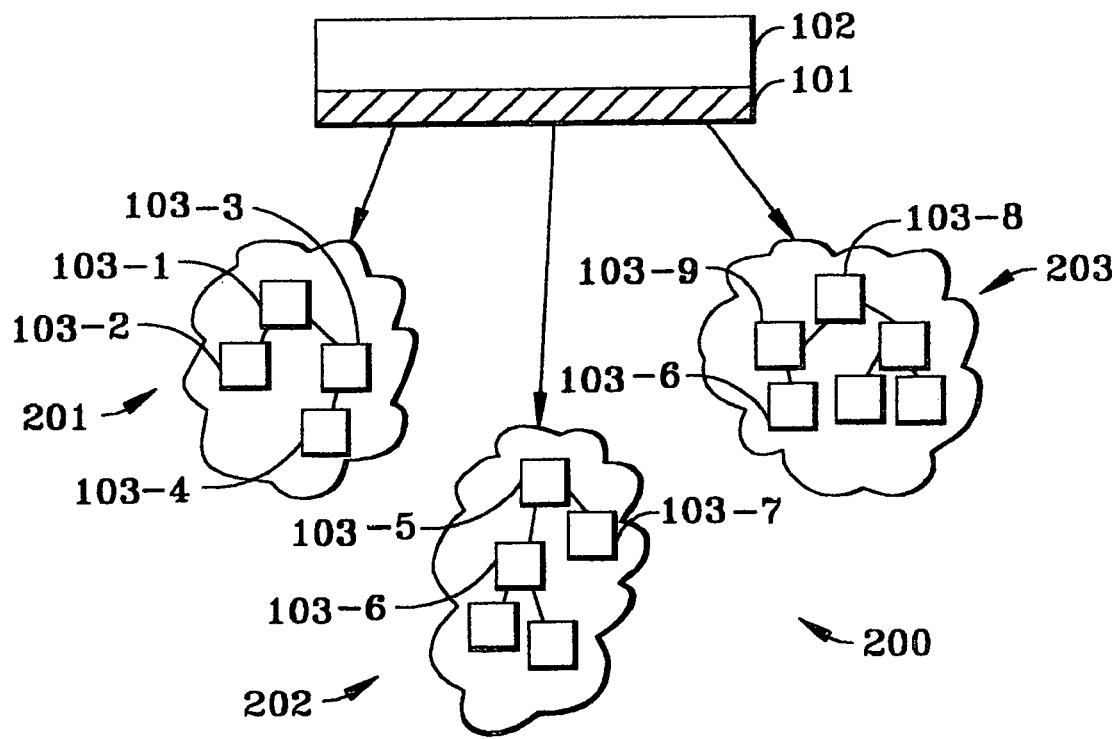
FIG. 2 is a schematic representation of a single-threaded computing environment with a single context.
Figure 3:
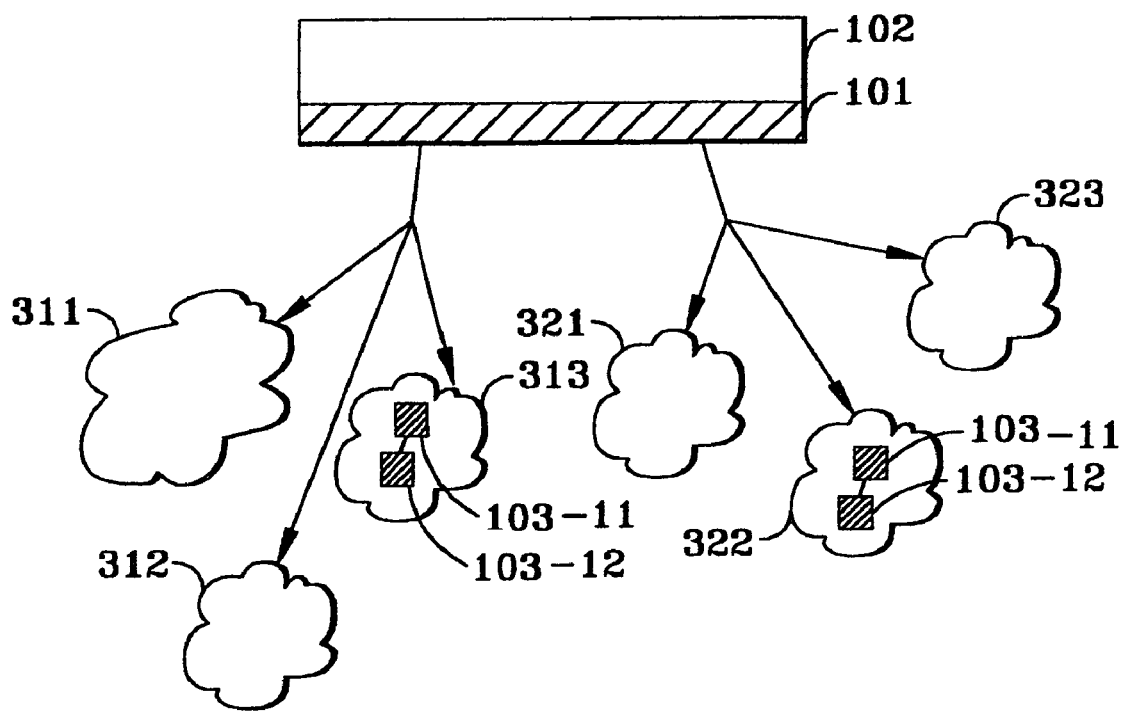
FIG. 3 is a schematic representation of a multi-threaded parallel processing environment with multiple contexts.
Figure 4:
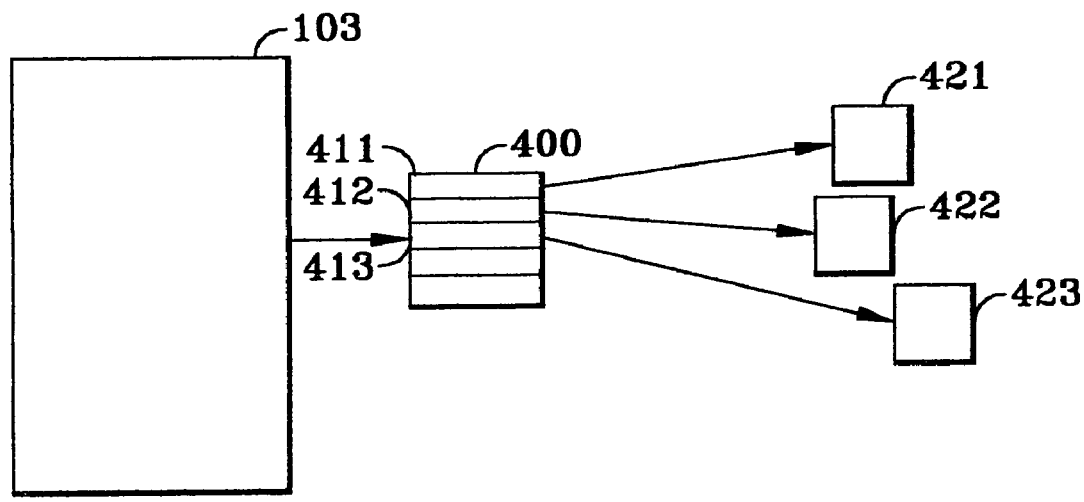
FIG. 4 shows a data pointer for a module.

A module 103 accesses data using a data pointer unique to the module. This arrangement is shown in FIG. 4. Data pointer 400 is an indexed array; each index 411, 412, 413 points to data 421, 422, 423 respectively. The data can be any data required by the module to provide a service to the driver application 102. (The indexing scheme is described in greater detail in the related previously filed disclosures.) When the module is in a context, the data pointer is an index of where data may be found for that context. When a module is loaded in the memory 100, a data structure of the form shown in FIG. 4 is created for each module and managed by the system.

Figure 5:
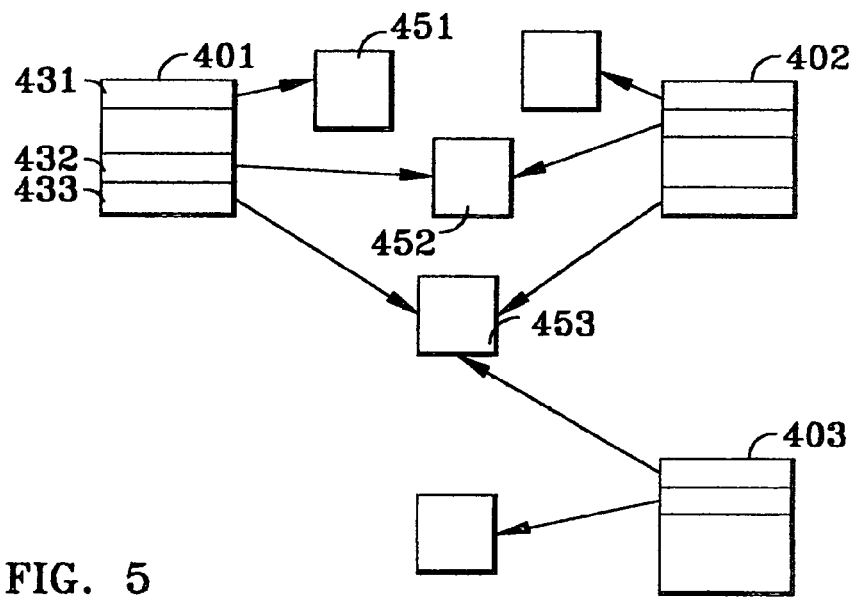
FIG. 5 shows multiple data pointers for private data and shared data.

The data objects may be "private" data (that is, accessed by only one module), or alternatively may be shared by two or more modules in a given context. This arrangement is shown schematically in FIG. 5. In pointer 401, index 431 points to private data 451, while index 432 points to a shared data object 452 and index 433 points to a shared data object 453. Indices in pointer 402 also point to data objects 452 and 453, and an index in pointer 403 also points to data object 453.

Loading Modules: Dynamic Stitching

In this embodiment of the invention, old and new modules are stitched together in response to a load command from the runtime library. This dynamic stitching or "hot plug" method ensures that a consistent set of data is available to a module at any given time. In particular, a module may be added or deleted without hindering the execution among various threads.

Figure 6:
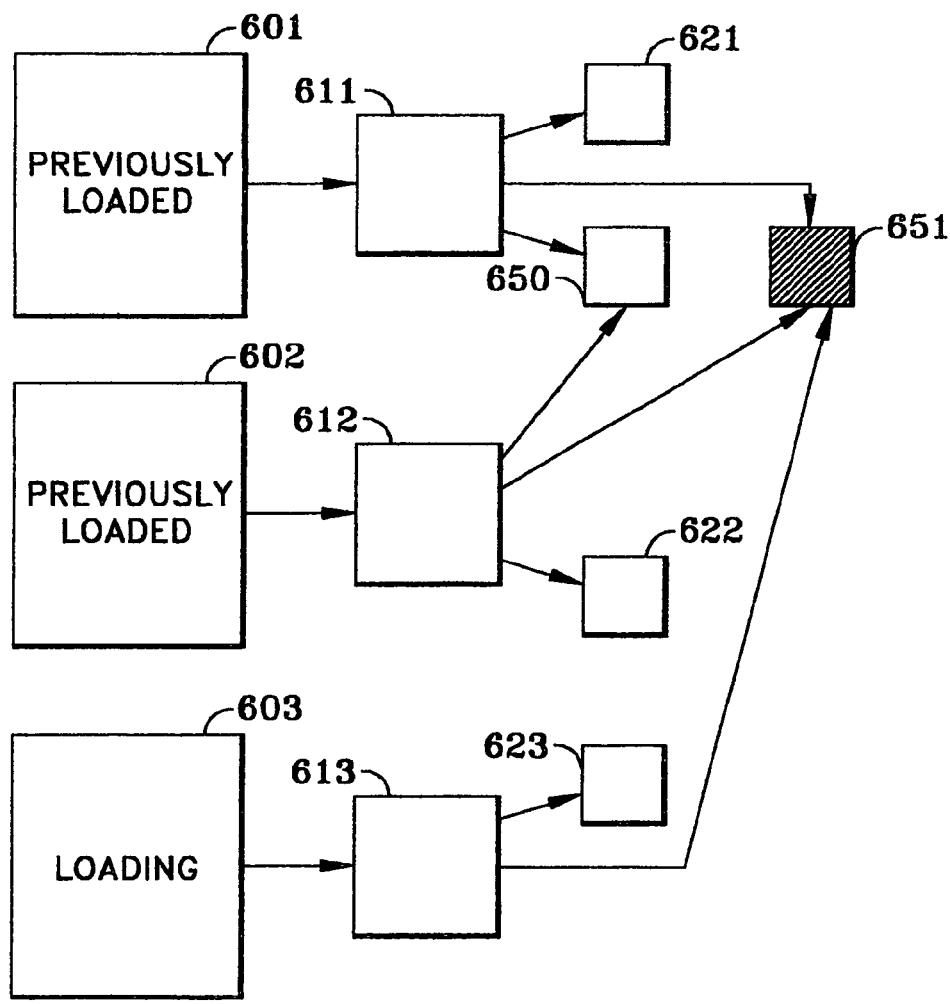
FIG. 6 shows modification of data pointers to reflect the addition of shared data during execution, according to an aspect of the present invention.

FIG. 6 shows an arrangement of previously loaded modules 601 and 602, and another module 603 which is to be loaded. Modules 601 and 602 have data pointers 611, 612 respectively, which point to private data 621, 622 and shared data 650. In the example of FIG. 6, new module 603 has data requirements such that pointer 613 is to point to private data 623 and shared data 650. However, modules 601 and 602 may be actively executing, and indeed may be actively sharing data 650. It should be noted that a conventional method of loading module 603 would then require interruption of execution of both modules 601, 602.

When the driver application program 102 issues the module load command, the system uses the system context to load the module 603. A new shared data object 651 is then created from data 650. (Data object 651 is in general not identical to 650, but may incorporate changes due to the loading of module 603. For example, data 650 may include a list of modules accessing the data. In that case, data 651 will reflect access by module 603.) Data pointer 613, private data 623 and new shared data 651 are created in freshly allocated memory space, and at this point are not yet visible to the existing modules 601 and 602.

The runtime library then plugs in the new data objects by rewriting the pointers of modules 601 and 602 to point to the new data object 651. In this embodiment, the pointers are atomic data (that is, data which can be updated by an uninterruptible operation of the processor); accordingly, changing the pointers is said to be an atomic operation. It should be noted that, since only the pointers are updated, the execution of the program is not disrupted. At any given time, each module sees either data object 650 or data object 651, but not a mixture of the two. References to data object 650 are removed, and data object 651 is made available, as a result of rewriting the pointers. A freshness indicator (described in more detail below), associated with each context and maintained by the runtime library, is used to monitor when the old data object 650 may be deleted.

Figure 7:
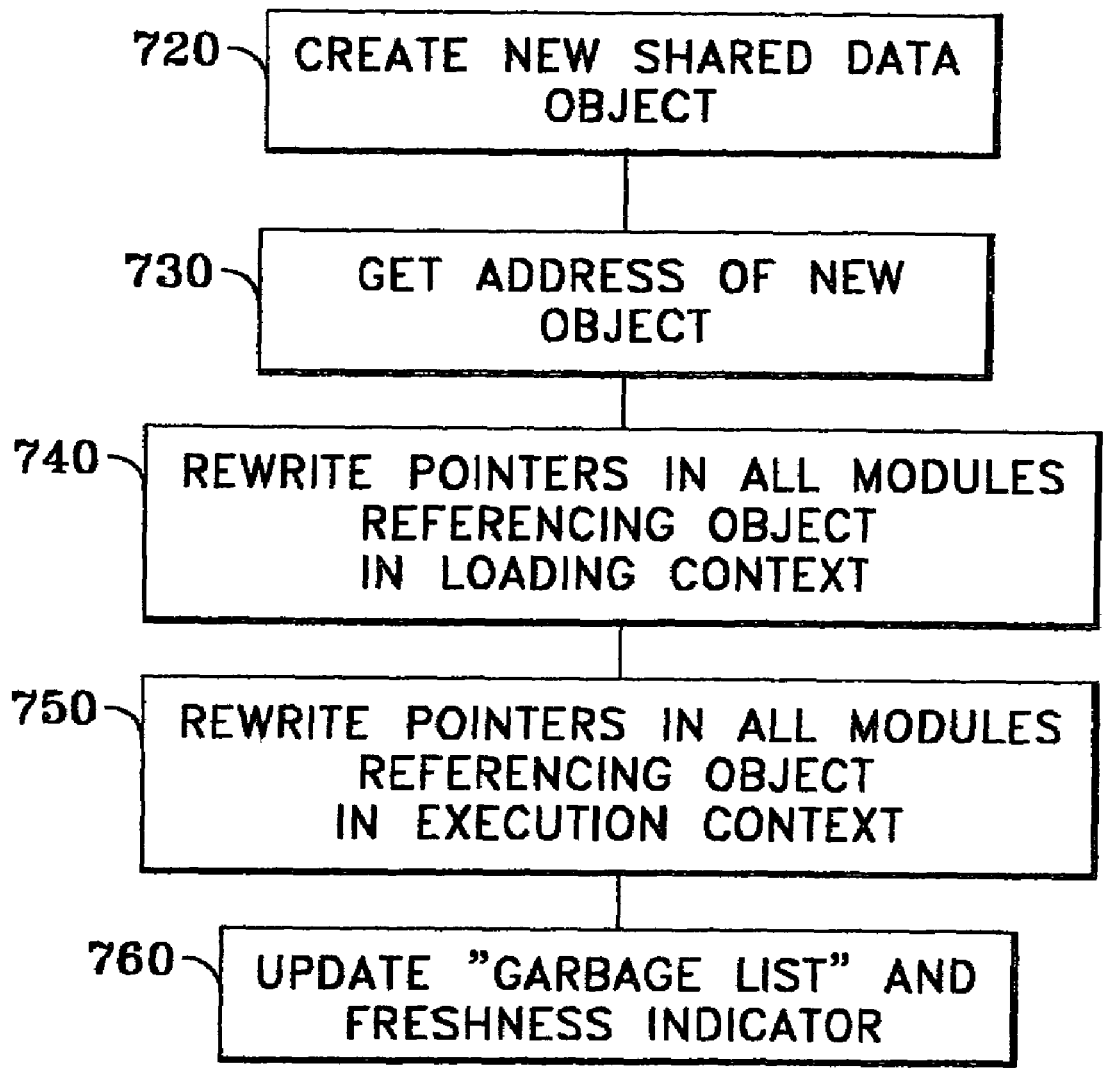
FIG. 7 is a flowchart showing steps in a method for dynamically loading a new module which shares data with other modules, during execution of those modules, in accordance with the present invention.

The steps for loading module 603 according to this "hot plug" method are detailed in FIG. 7. A new shared data object 651 is created in step 720. The runtime library gets the address of the new shared data object 651 (step 730). The runtime library rewrites the pointers in all the modules referencing data object 650 in the loading context (step 740) and in the execution context (step 750). (It is understood that in general there are plural execution contexts accessing data object 650.) This has the effect of removing references to the old data object 650 from the execution context. At this point the old data object is not deleted, since it may still be in use by another context. However, a reference to it is placed on the "garbage list" (that is, a list of data objects being prepared for deletion) and the freshness indicator is updated to reflect that a new data object is available (step 760).

Data Freshness Indicators

A freshness indicator (typically an integer) is incremented with each module load (regardless of the number of modules loaded in that module load), to signify that a new set of shared data has been created. A master freshness indicator, or "system freshness," indicates the freshness level of all data in all contexts. This is used to manage "garbage collection;" when old data is no longer being accessed by any context, it may safely be deleted.

Each context also has a freshness indicator associated therewith, signifying the last known freshness of the data accessed in that context. Old data remains intact until all the contexts have registered the fact that they have caught up with the latest data. To ensure this, the old data is "stamped" with the current value of the master freshness indicator. When execution in a context accesses certain data, the context freshness indicator is set to the value of the master freshness indicator. The "garbage collector" thread, independently executing, uses this change to determine which data are no longer accessible and thus can be deleted. These determinations may be made at intervals or at times chosen to provide timely updates (but not so often that processor time is unduly wasted).

Figure 8:
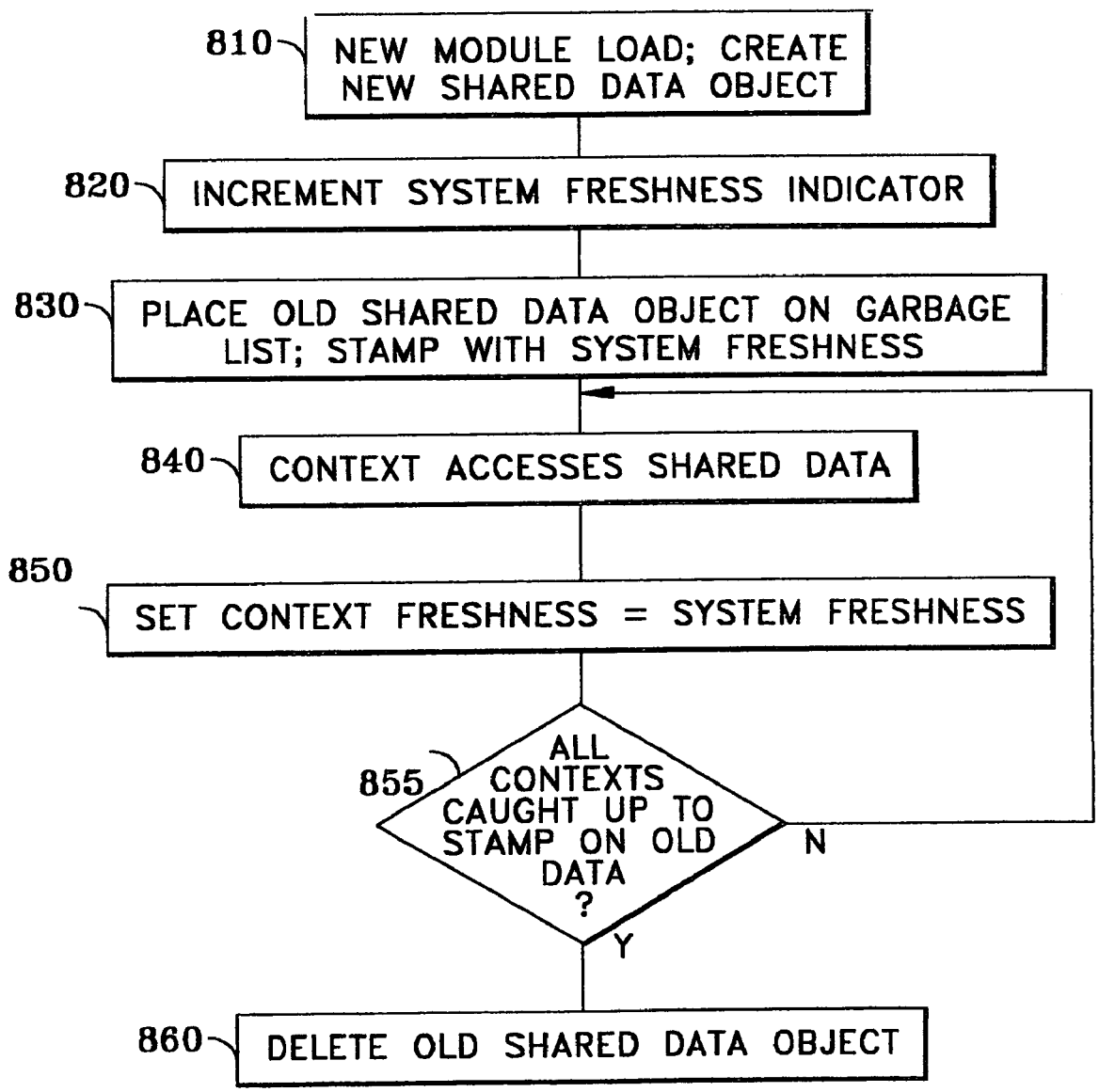
FIG. 8 is a flowchart showing steps in a method for updating freshness indicators and deleting old data, in accordance with the present invention.

Steps in a method for managing old and new shared data objects by updating freshness indicators are shown in FIG. 8. When a new module (which is to share data with previously loaded modules) is loaded, a new shared data object is created (step 810). The system freshness indicator is incremented to reflect creation of the new data object (step 830). The old data object is placed on the "garbage list" and stamped with the current system freshness (step 820). At this point, the new shared data object is available for access by a context. Accordingly, if a context performs a new access of shared data, the new data object should be accessed instead of the old data object. Thus, when a context accesses the shared data (step 840), the freshness indicator for that context is set equal to the system freshness (step 850). When all the contexts have at least caught up to the freshness stamp of a given old data object (step 855), that old data object is deleted (step 860).

Figure 9:
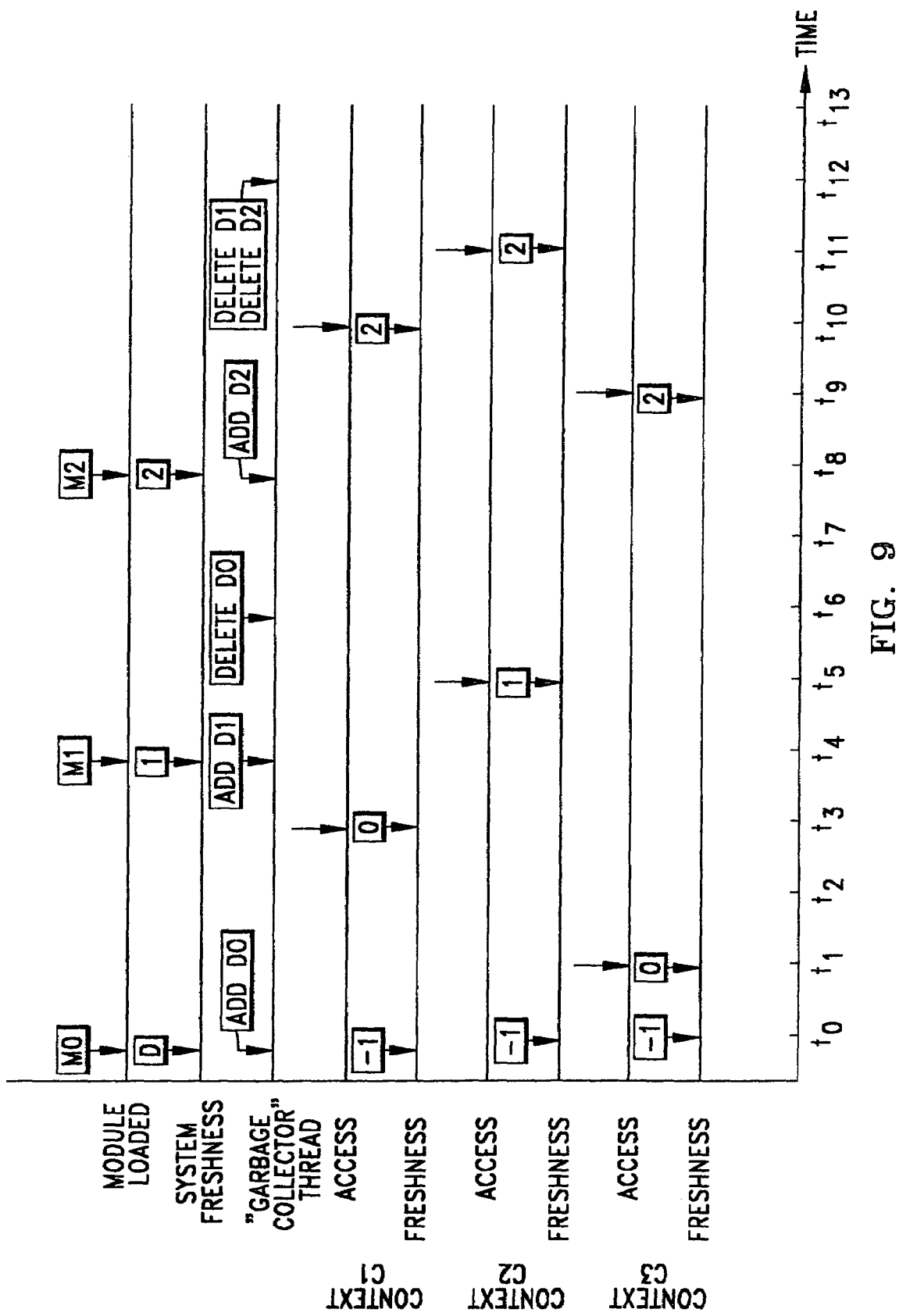
FIG. 9 is a timing chart showing the effect of dynamic stitching of modules and updating of freshness indicators, in accordance with the method of FIG. 8.

A timing chart showing an example of freshness indicator updates, when modules are loaded using the above-described "hot plug" method, is given in FIG. 9. For convenience the time axis is marked in equal intervals. At time $t_0$, module M0 is loaded and new shared data (such as object 651 shown in FIG. 6) is created. The system freshness is set to 0. The garbage collector thread keeps track of all the old data (such as object 650 in FIG. 6); old shared data D0 is placed on the garbage list, with a freshness stamp of 0.

When a context accesses shared data, the context copies the system freshness value to the context's freshness indicator. This indicates that the context has accessed a new data aggregate, and thus could subsequently access any new data aggregate. At time $t_0$, none of contexts C1, C2 or C3 have accessed the new data; accordingly, they each have a context freshness of −1.

At time $t_1$, context C3 accesses some shared data. The data accessed by the context might not in fact be the new shared data created in the "hot plug" method; however, the freshness value for the context is updated to reflect the fact that the context could access the new shared data at time $t_1$, or any subsequent time. The context freshness value for C3 is thus set to 0. At time $t_3$, context C1 accesses shared data, and its freshness value is likewise set to 0.

At time $t_4$, a new module M1 is loaded; additional new shared data is created, and the system freshness indicator is incremented to 1. Old data D1 is placed on the garbage list, with a freshness stamp of 1. There are now two sets of old data. At time $t_5$, context C2 accesses the shared data; the freshness value for C2 is thus set to 1 (note that C2 made no access of shared data between the M0 and M1 module loads, so its freshness indicator was not set to 0). At time $t_6$, the garbage collector thread examines the context freshness indicators and finds that all three indicators are now at least 0. This means that all of contexts C1, C2 and C3 have caught up to the freshness state when module M0 was loaded and data D0 was placed on the garbage list; accordingly, data D0 may be deleted. At time $t_6$, data D0 is deleted. At time $t_8$, module M2 is loaded, so that the system freshness indicator is incremented to 2 and old data D2 is placed on the garbage list. At times $t_9$, $t_{10}$ and $t_{11}$ respectively, contexts C3, C1 and C2 access shared data and have their context freshness indicators set to 2. At time $t_{12}$, the garbage collector thread again examines the context freshness indicators, and determines that all three contexts have accessed shared data since module M2 was loaded; this means that data D1 and D2 may both be safely deleted.

It should be emphasized that (1) a given context "catches up" to the current value of the system freshness when it performs a new access to shared data (thereby accessing data which is at least as new as the newly created shared data object), and (2) that an old data object in the garbage list is deleted only when all of the contexts have caught up to the freshness stamp associated with that old data object.

It will be appreciated that the new data object is made available to the old and new modules without the need to serialize access to the data object. This in turn facilitates parallel access to the data object, with consequent performance benefits.

Usage Blocking

In the preceding discussion, a new data object 651 was created from an old data object 650, and pointers to the new data object (to be shared by a newly loaded module) were modified in an atomic operation. Alternatively, the shared data object may be too large for a complete duplication thereof to be desirable, or it may be necessary to modify the data in an operation that is not an atomic operation. In such cases, access to the data must be temporarily blocked, as detailed below.

Figure 10:
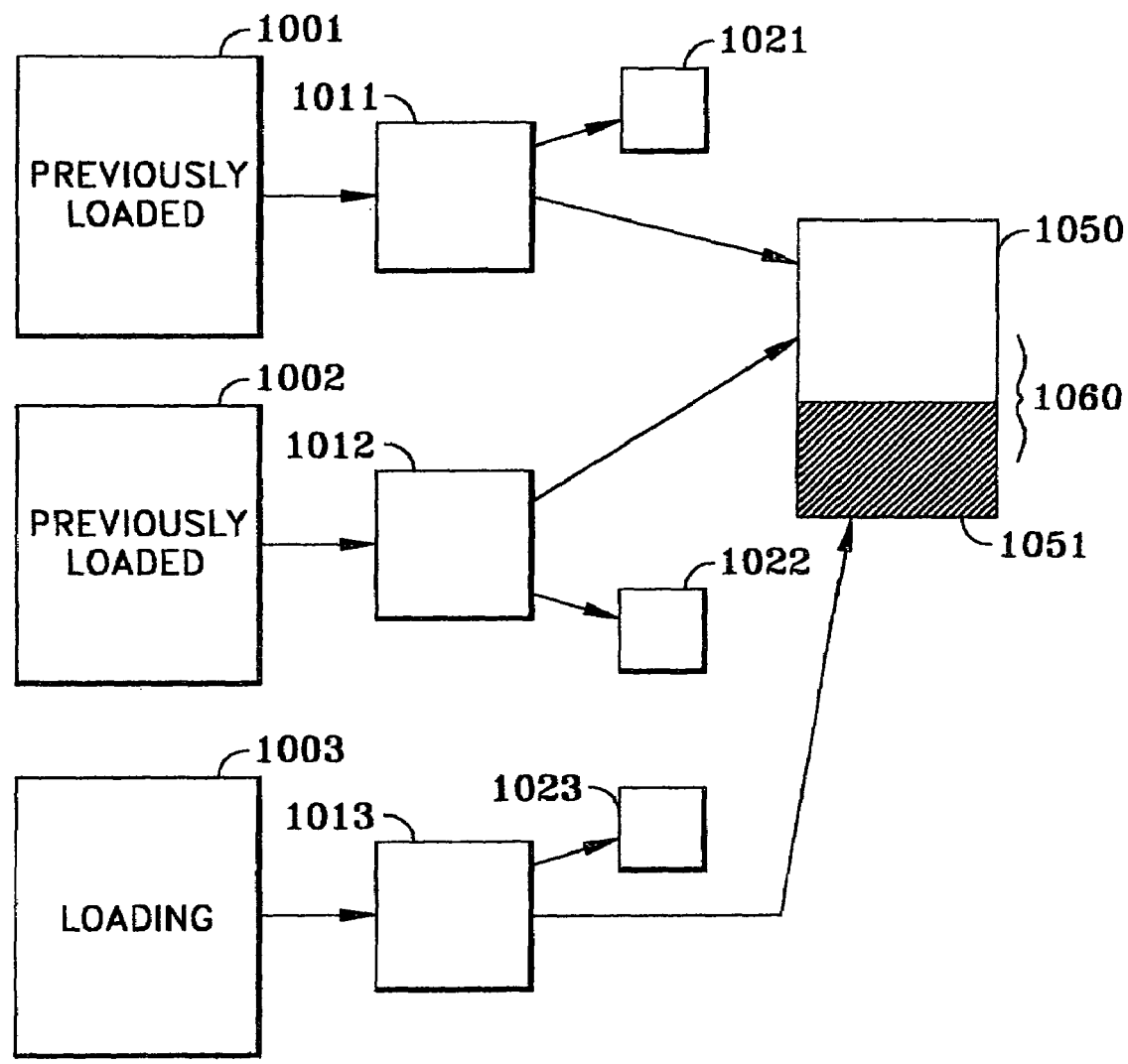
FIG. 10 shows modification of data pointers to reflect the addition of data to a shared data aggregate during execution, according to another aspect of the present invention.

FIG. 10 shows an arrangement of modules where modules 1001 and 1002 have been previously loaded, and module 1003 is to be loaded in response to a module load command. Each module may have one or more threads, depending on how many flows of control are executing the code in that module. The modules have data pointers 1011, 1012, 1013 respectively; execution of code in the respective-modules may cause private data 1021, 1022, 1023 to be accessed. Similarly, execution of code in modules 1001 and 1002 may cause access to a shared data aggregate (data object 1050), for example by calling a subroutine.

The loading of new module 1003 causes a modification of data object 1050; specifically, new data 1051 is appended to data 1050, resulting in formation of a new data object 1060. In this case, the modification of data aggregate 1050 is not an atomic operation. Access to this data by all contexts (other than access by the system context) must be prevented while the data aggregate is modified (in this example, while new data 1051 is added). More specifically, it is necessary to block execution of code involving access to the data object while the data object is being modified.

The usage blocking method prevents a given context from executing a specific piece of code. In particular, the method prevents a context from invoking code, the execution of which would result in accessing a data object, while the data object is being updated by the system context (such as data aggregate 1050 which is updated to yield data aggregate 1060).

Figure 11:
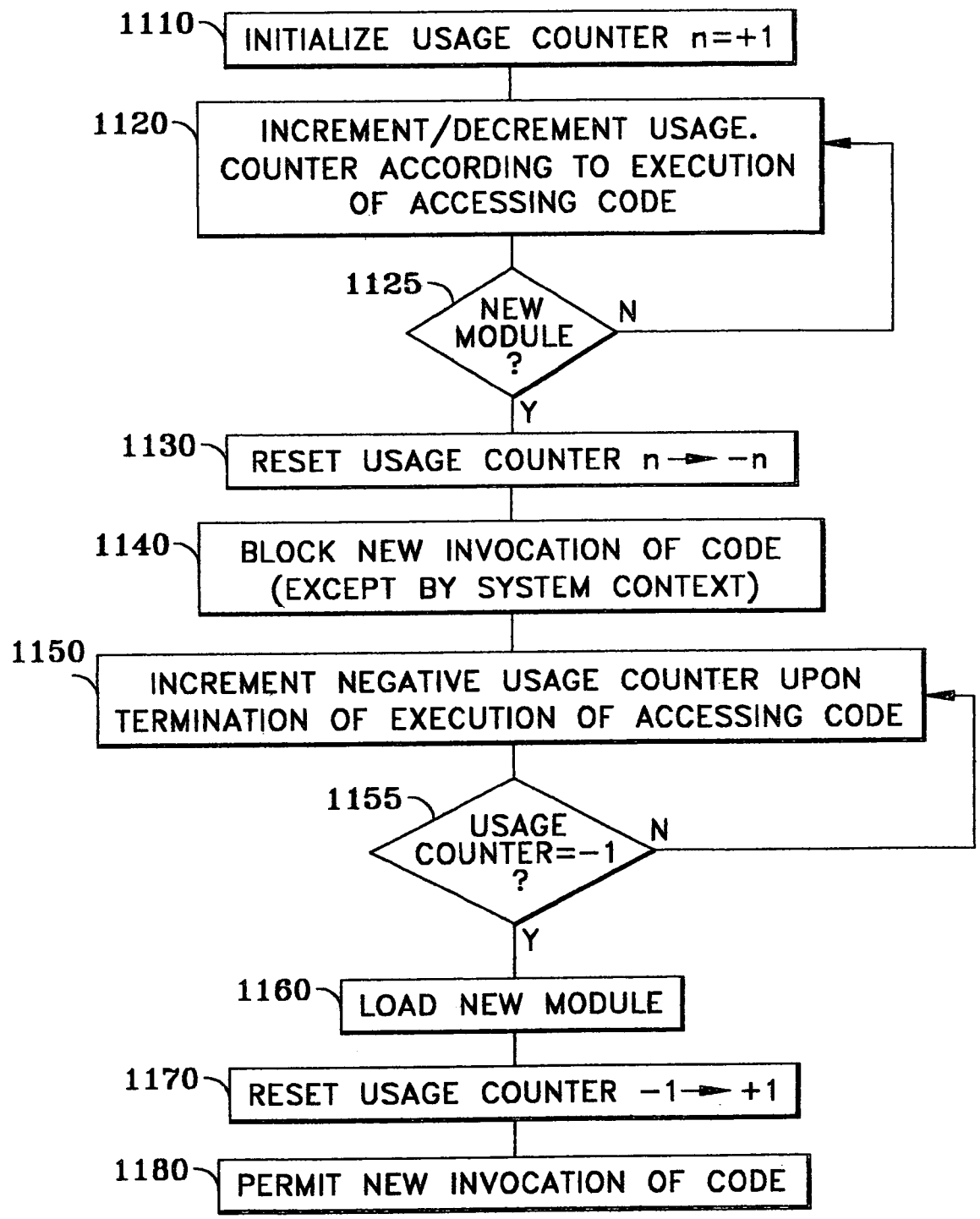
FIG. 11 shows steps in a method for dynamically stitching a new module when a data aggregate shared with other modules is modified during execution of those modules, in accordance with the present invention.

FIG. 11 shows steps of the usage blocking method. The code (such as a subroutine for accessing the data aggregate, characterized simply as accessing code) may be for example a query, update or delete function. Each data aggregate has associated therewith a usage counter. This counter reflects the number of contexts in which accessing code is executing to cause access to a given data aggregate at a given time. The usage counter is initialized to +1 (step 1110). When a context enters a piece of accessing code (that is, invokes the code so that it begins to execute), the counter is incremented by 1; when the context exits the code (that is, when execution of the code is complete), the counter is decremented by 1 (step 1120). The incrementing and decrementing are atomic operations.

It should be noted that parallel execution of the code may be performed, so that more than one context may be in a given piece of accessing code at one time (that is, there may be multiple invocations of the code before execution of the code is finished).

When a new module is to be loaded (step 1125), the system context replaces the usage counter by its negative value in another atomic operation. The negative value signifies that entry to the accessing code by any context (that is, a new invocation of that code) is blocked, except for entry by the system context (step 1140). As long as the usage counter is negative, it is incremented by 1 when any context already in the code exits (step 1150). A usage counter value of −1 therefore serves as a signal to the system context that usage has successfully been blocked; no context may cause access to the data aggregate, and all contexts which were accessing the data aggregate have exited the accessing code (step 1155). The new module may then be loaded (step 1160), including any necessary updates of the shared data aggregate.

When loading of the new module is complete, the system context negates the usage counter value, so that it returns to its initial value of +1 (step 1170). Normal access of the data aggregate is again permitted (step 1180); any contexts waiting to access the data aggregate may do so.

It should be noted that the usage blocking method described herein facilitates parallel processing. If access to the data instead proceeded serially, with only one thread at a time permitted to access the data, access to the data could simply be locked as long as required for modification of the data. Such a scheme, however, would require serialized access to the data when normal operation resumed. In the present embodiment, by contrast, the incrementing, decrementing and resetting of the usage counter are atomic operations; an update of the counter may be performed very quickly (typically requiring about five instructions). It will be appreciated by those skilled in the art that this usage blocking method does not require the operating system to save the state of the executing thread while the access counter is updated. Accordingly, the delay in execution is very small.

Figure 12A:
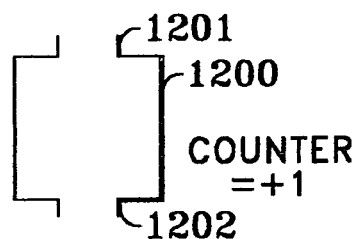
FIG. 12A–12F are a schematic representation of the effect of the method of FIG. 11.
Figure 12B:
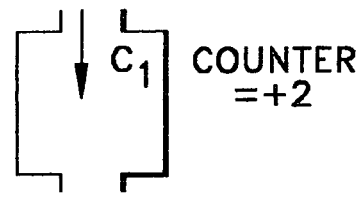
Figure 12C:
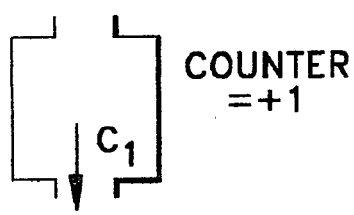
Figure 12D:
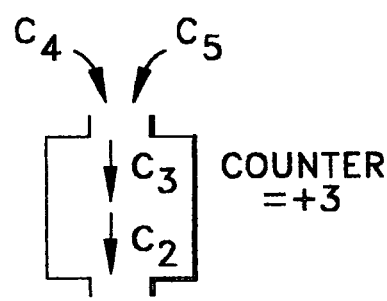
Figure 12E:
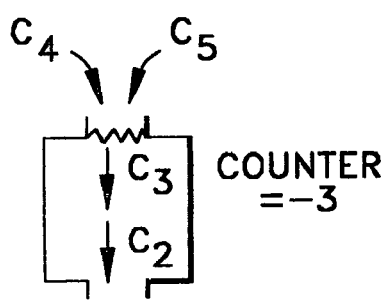
Figure 12F:
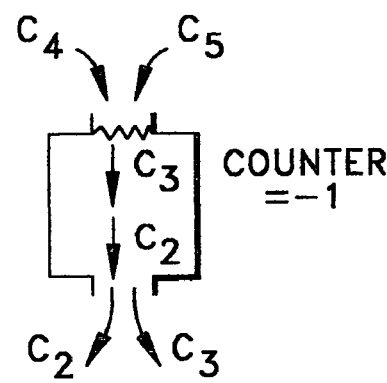

The effect of this method is shown schematically in FIGS. 12A–12F. A piece of accessing code (e.g. a subroutine which when called results in access to the data) is represented by 1200 with entry point 1201 and exit point 1202. Initially, with no executing context in the code, the usage counter for a given data aggregate is +1 (FIG. 12A). When context C1 enters the code (that is, the accessing code is invoked to access the data object), the counter is incremented to +2 (FIG. 12B); when the context exits the code the counter is decremented to +1 (FIG. 12C). In FIG. 12D, two contexts C2 and C3 are executing in parallel, so that the usage counter is +3; two other contexts C4 and C5 are about to enter the code also. At this point, a module load is initiated; the system context negates the usage counter from +3 to −3, new invocation of the code is blocked, and contexts C2 and C3 continue to execute (FIG. 12E). When contexts C2 and C3 each exit the code, the usage counter is incremented by 1; accordingly, after all contexts which were in the code have exited, the usage counter is −1 (FIG. 12F). All new invocation of the code has been blocked, so that access to the data object is prevented and the new module load (together with modification of the data) can safely proceed.

It should be noted that only those executing contexts which are attempting to invoke the accessing code 1200 to access the particular data aggregate have their execution delayed; other executing contexts in the parallel processing environment, which may be accessing other data aggregates, are not affected.

Unloading a Module

When a module is to be unloaded, a "dynamic unstitching" process is initiated which employs features of the above-described "hot plug" and usage blocking methods.

Figure 13:
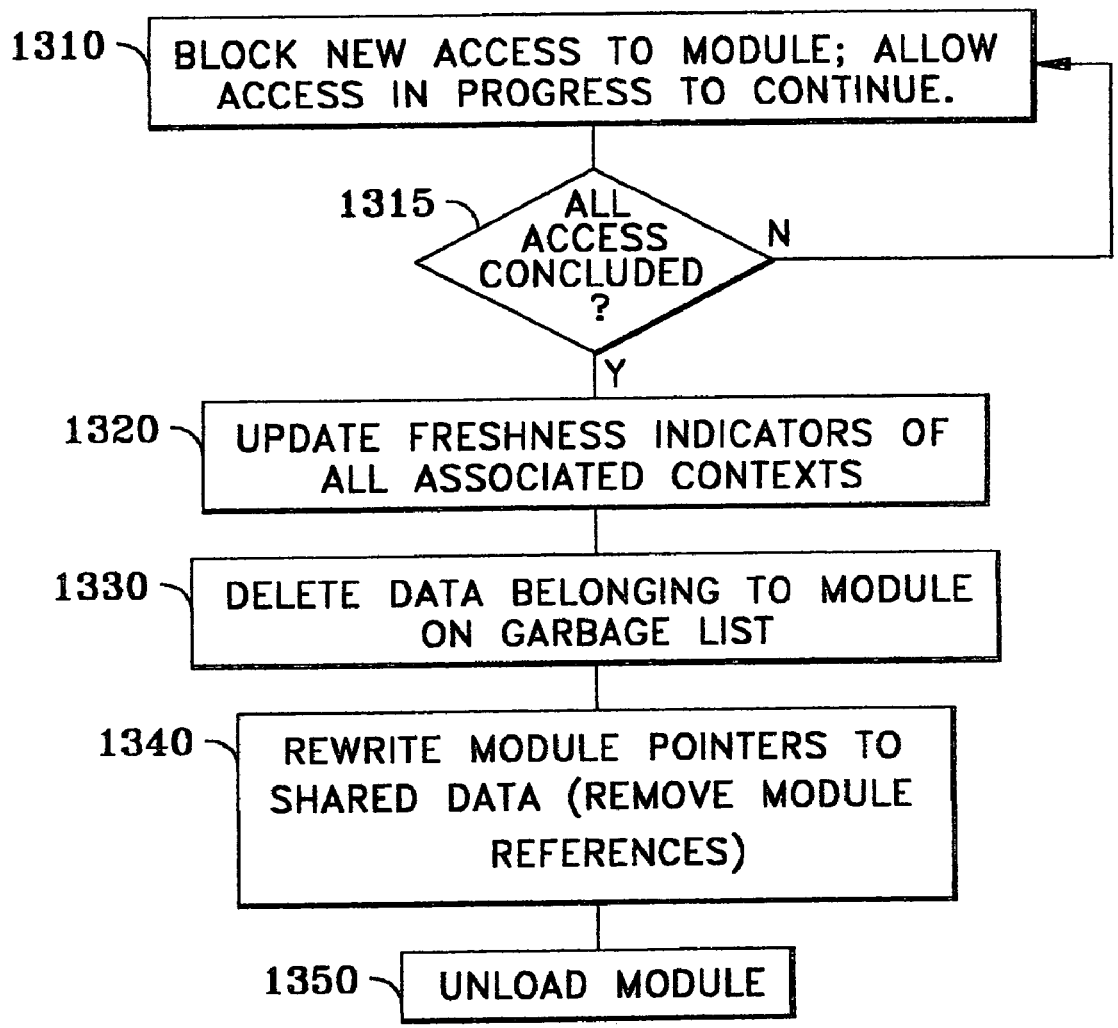
FIG. 13 shows steps in a method for unloading a module, in accordance with a further aspect of the present invention.

Steps in the unloading process are shown in FIG. 13. All execution access to the module being unloaded is blocked using the above-described usage blocking method (step 1310). Executing contexts blocked at entry to the module return with an error code without entering the module. Executing contexts already in the module to be unloaded are allowed to execute and exit the module. When all contexts have exited the module, all access to the module is finished (step 1315). The freshness indicators of all the contexts associated with the module are updated by the system context (step 1320). All items on the garbage list which belong to the module and are not shared by any other modules may then be deleted (step 1330). If the module points to any shared data objects, the system context informs the system that the module no longer refers to those objects. As described above, this is done by rewriting the pointers associated with the module (step 1340). At this point the module is no longer accessible by executing contexts and no longer refers to any shared data objects; accordingly, the module may then be unloaded (step 1350).

Since new entry to the module to be unloaded is blocked, while current usage of the module is allowed to proceed to completion, it is not necessary for the system to determine whether the module to be unloaded still has a thread executing therein. It will be appreciated that this greatly simplifies development of parallel applications.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for performing dynamic stitching of a new module of executable code in a parallel processing environment, where said new module and another module previously loaded share access to a data object, said access being performed using a first data pointer associated with the new module and having a first pointer value and a second data pointer associated with the other module and having a second pointer value, the method comprising the steps of:

loading said new module, so that said new module and the other module execute in parallel;

creating a new data object for shared access by said new module during execution thereof and by the other module during execution thereof, in place of an old data object, the new data object being created when said new module is loaded;

updating a first data freshness indicator in accordance with creation of the new data object;

associating a value of the first freshness indicator with the old data object;

establishing the first pointer value to permit access to the new data object by said new module;

modifying the second pointer value, thereby terminating reference to the old data object and substituting reference to the new data object;

updating a second data freshness indicator in accordance with access by the other module to shared data after creation of the new data object; and deleting the old data object when a comparison of said second data freshness indicator with the value associated with the old data object indicates that access to the old data object is not required.

2. The method of claim 1, wherein the first pointer value and the second pointer value are atomic data, so that said modifying of the second pointer value is an atomic operation.

3. The method of claim 1, wherein said updating of the first data freshness indicator comprises incrementing the first data freshness indicator by 1.

4. The method of claim 1, further comprising the steps of:

establishing a list of data objects subject to deletion; and adding the old data object to said list after creating of the new data object.

5. The method of claim 1, wherein said step of updating the second data freshness indicator comprises setting the second data freshness indicator equal to the first data freshness indicator.

6. The method of claim 1, wherein said new module and a plurality of other modules previously loaded share access to the new data object, the modules comprise a plurality of contexts, and a separate second data freshness indicator, characterized as a context freshness indicator, is associated with each context.

7. The method of claim 6, wherein said deleting is performed after the context freshness indicators have been updated so that all the context freshness indicators are not less than the value associated with the old data object.

8. A computer-readable storage medium having stored therein instructions for performing a method for performing dynamic stitching of a new module of executable code in a parallel processing environment, where said new module and another module previously loaded share access to a data object, said access being performed using a first data pointer associated with the new module and having a first pointer value and a second data pointer associated with the other module and having a second pointer value, the method comprising the steps of:
   loading said new module, so that said new module and the other module execute in parallel;
   creating a new data object for shared access by said new module during execution thereof and by the other module during execution thereof, in place of an old data object, the new data object being created when said new module is loaded;
   updating a first data freshness indicator in accordance with creation of the new data object;
   associating a value of the first freshness indicator with the old data object;
   establishing the first pointer value to permit access to the new data object by said new module;
   modifying the second pointer value, thereby terminating reference to the old data object and substituting reference to the new data object;
   updating a second data freshness indicator in accordance with access by the other module to shared data after creation of the new data object; and
   deleting the old data object when a comparison of said second data freshness indicator with the value associated with the old data object indicates that access to the old data object is not required.

9. The computer-readable storage medium of claim 8, wherein the first pointer value and the second pointer value are atomic data, so that said modifying of the second pointer value is an atomic operation.

10. The computer-readable storage medium of claim 8, wherein said updating of the first data freshness indicator comprises incrementing the first data freshness indicator by 1.

11. The computer-readable storage medium of claim 8, wherein the method further comprises the steps of:
   establishing a list of data objects subject to deletion; and
   adding the old data object to said list after creation of the new data object.

12. The computer-readable storage medium of claim 8, wherein said step of updating the second data freshness indicator comprises setting the second data freshness indicator equal to the first data freshness indicator.

13. The computer-readable storage medium of claim 8, wherein said new module and a plurality of other modules previously loaded share access to the new data object, the modules comprise a plurality of contexts, and a separate second data freshness indicator, characterized as a context freshness indicator, is associated with each context.

14. The computer-readable storage medium of claim 13, wherein said deleting is performed after the context freshness indicators have been updated so that all the context freshness indicators are not less than the value associated with the old data object.

15. A computer program product embodying instructions for performing a method for performing dynamic stitching of a new module of executable code in a parallel processing environment, where said new module and another module previously loaded share access to a data object, said access being performed using a first data pointer associated with the new module and having a first pointer value and a second data pointer associated with the other module and having a second pointer value, the method comprising the steps of:
   loading said new module, so that said new module and the other module execute in parallel;
   creating a new data object for shared access by said new module during execution thereof and by the other module during execution thereof, in place of an old data object, the new data object being created when said new module is loaded;
   updating a first data freshness indicator in accordance with creation of the new data object;
   associating a value of the first freshness indicator with the old data object;
   establishing the first pointer value to permit access to the new data object by said new module;
   modifying the second pointer value, thereby terminating reference to the old data object and substituting reference to the new data object;
   updating a second data freshness indicator in accordance with access by the other module to shared data after creation of the new data object; and
   deleting the old data object when a comparison of said second data freshness indicator with the value associated with the old data object indicates that access to the old data object is not required.

16. The computer program product of claim 15, wherein the first pointer value and the second pointer value are atomic data, so that said modifying of the second pointer value is an atomic operation.

17. The computer program product of claim 15, wherein said updating of the first data freshness indicator comprises incrementing the first data freshness indicator by 1.

18. The computer program product of claim 15, wherein the method further comprises the steps of:
   establishing a list of data objects subject to deletion; and
   adding the old data object to said list after creation of the new data object.

19. The computer program product of claim 15, wherein said step of updating the second data freshness indicator comprises setting the second data freshness indicator equal to the first data freshness indicator.

20. The computer program product of claim 15, wherein said new module and a plurality of other modules previously loaded share access to the new data object, the modules comprise a plurality of contexts, and a separate second data freshness indicator, characterized as a context freshness indicator, is associated with each context.

21. The computer program product of claim 20, wherein said deleting is performed after the context freshness indicators have been updated so that all the context freshness indicators are not less than the value associated with the old data object.

* * * * *